Aug. 7, 1956 A. GUSTAFSSON 2,758,192
SOLDERING IRON
Filed Aug. 30, 1954
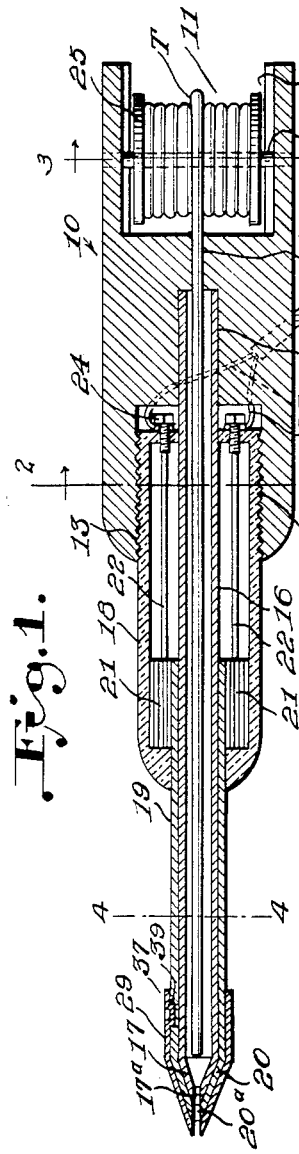
INVENTOR.
BY

United States Patent Office 2,758,192
Patented Aug. 7, 1956

2,758,192

SOLDERING IRON

Amuth Gustafsson, Stockholm, Sweden

Application August 30, 1954, Serial No. 452,897

5 Claims. (Cl. 219—26)

This invention relates to a soldering iron.

Soldering irons now more generally in use comprise a rather massive bar of copper having one end thereof tapered off, or of generally pyramidal shape.

Such irons, in use, have the tapered-off or working end thereof heated to a high temperature and a mass of tin is contacted with the heated end at points of soldering, the heated end being used to spread the solder deposits from the mass of tin.

Such form of soldering irons have, of course, proven successful when same are in proper working condition.

Such forms of soldering irons are, however, subject to corrosion by the tin with a resulting uneven working surface on the head, or peak thereof, and a satisfactory soldering operation cannot be provided with a soldering iron whose peak fails to have smooth, even working surfaces. While the corroded and uneven peaks are capable of being rendered workable by grinding down the surfaces, much work and loss of time is entailed thereby and the finished working surfaces are of course of less areas than the original ones.

It is accordingly one of the objects of this invention to provide a soldering iron having a removable and replaceable peak.

A further and more particular object of the invention is to provide a soldering iron of tubular construction including a terminal peak, and which embodies a removable thin walled working peak which is removably secured to the first peak, whereby upon corrosion of the working peak same may be discarded and replaced by a new working peak which is capable of production at relatively small cost.

A still further object of the invention is to provide a soldering iron which embodies heating means therein together with a finger operable roll for supporting a coiled thread of tin which is movable through an axial bore in the iron to its working position at the peak.

Other objects and advantages of the invention will become apparent in the course of the following detailed description taken in connection with the accompanying drawing, wherein:

Fig. 1 is a longitudinal axial section of the improved soldering iron in accordance with a preferred structural embodiment thereof.

Fig. 2 is a transverse sectional view as observed in the plane of line 2—2 on Fig. 1.

Fig. 3 is a transverse sectional view as observed in the plane of line 3—3 on Fig. 1.

Fig. 4 is a transverse sectional view as observed in the plane of line 4—4 on Fig. 1.

Figs. 5, 6 and 7 are side elevational views of three different forms of removable peak for operative association with the iron of Fig. 1.

Referring now in detail to the drawing, 10 designates a handle of any desired form and material. The rear end of the handle is provided with a recess 11 and the forward end thereof is provided with a recess 12 having a cylindrical wall which for the major length thereof is threaded as indicated at 13. The handle 10 is further provided with an axial bore 14 which opens into the recess 12 and whose bottom is spaced from the recess 11 and a further bore 15 of substantially less diameter than bore 14 extends axially of the handle with its opposite ends opening into recess 11 and bore 14.

An elongated tube 16 is disposed axially of the handle 10 and has its rear end portion seated in the bore 14. The tube 16 is provided with a pyramidal peak 17 and the tube and peak are constructed of any desired material which is not subject to damage through corrosion by the soldering tin.

A tubular member 18 of insulating material, such as porcelain is provided with an externally threaded rear portion which engages the threads 13 on the handle for removability of the tubular member and a copper tube 19 has its rear end portion disposed within and suitably secured to the tubular member 18 and the said tube 19 telescopes the tube 16. The tube 19 is provided with a pyramidal peak 20 overlying the peak 17 and peaks 17 and 20 are provided with tin exuding holes 17ª and 20ª respectively in their outer ends. Electrical heating elements 21 are disposed within the tubular member 18 adjacent its forward end and same are preferably confined between the forward wall of the tubular member 18 and the rear end of the tube 19 as is clearly indicated in Fig. 1.

Electrical conductors 22 are also disposed within the tubular member 18 and with which are detachably connected input leads 23 by means of screw 24. The above referred to recess 11 accommodates a roll or spool 25 which is preferably provided with a supporting shaft 26 slidably disposed within an axial bore in the roll and aligned bores in the wall of the handle 10 whereby provision is made for removing empty rolls and replacing same with loaded rolls. The rolls are provided with coils of tin thread T, a tangential portion of which is extendable through the tube 16 and into the peak 17 thereof as is indicated in Fig. 1 whereby the end of the extended length of tin is melted by the heating element 21.

At this point, it is to be particularly observed that the recess 11 opens through the handle 10 at one side thereof as indicated at 27 whereby the roll is accessible externally of the handle for finger engageable rotation thereof to direct the strand of tin thread into the peak 17.

An important feature of the invention is a readily detachable working peak which is disclosed in three different structural embodiments thereof in Figs. 5, 6 and 7 and which are designated 28, 29 and 30, respectively. The peaks provide the working end of the soldering iron and are capable of being readily removed and replaced by new ones when same become corroded to an extent that their efficiency has become impaired. Each of the peaks embodies a relatively thin shell and includes a cylindrical attaching portion 31 and a pyramidal working end portion 32.

Of the three forms of peak illustrated in Figs. 5, 6 and 7, the pyramidal working end 32 is of similar construction and wherein one surface thereof is provided with a slot 33 extending rearwardly from the pointed end thereof to a point adjacent the cylindrical portion 31 and the slot may terminate in a hole 34 as indicated. The purpose of the slot and hole is to permit flow of melted tin from the holes 17ª and 20ª and onto the outer surface of the working peak.

The three peaks 28, 29 and 30 differ in their cylindrical portions which removably engage the forward end of the tube 19. The peak 28 has the cylindrical portion 31 thereof provided with a plurality of slots 35 providing a plurality of tongues 36 therebetween and which tongues are inwardly bent to provide frictional contact with the tube 19 for removably holding the peak thereon.

In the embodiment of Fig. 6 the cylindrical portion 31 is slit in the provision of a tongue 37 having a head 38 which is receivable in a depression 39 in the tube 19 as indicated in Fig. 1.

In the embodiment of Fig. 7, the cylindrical portion 31 is provided with a tapped hole 40 which is adapted to receive a set screw for frictional engagement with the tube 19.

While I have disclosed my invention in accordance with certain specific structural embodiments thereof, such is to be considered as illustrative only, and not restrictive, the scope of the invention being defined in the subjoined claims.

What I claim and desire to secure by U. S. Letters Patent is:

1. A soldering iron comprising a handle, a copper tube projecting forwardly from said handle, a solder depositing and working peak on the forward end of said tube, heating means for said tube and peak supported by said handle, means in said handle for supporting a coiled strand of soldering tin which is projectible through said tube and into proximity to said peak, said heating means being disposed within an insulating tubular member removably connected to and projecting forwardly from said handle, said tube projecting into said tubular member inwardly of said heating means, and a second tube having one end thereof seated in a bore in said handle and having the forward portion thereof disposed within and in engagement with said first tube.

2. The structure according to claim 1, wherein said second tube is provided with a peak disposed within and supporting said first peak.

3. A soldering iron comprising a handle, a copper tube projecting forwardly from said handle, a solder depositing and working peak on the forward end of said tube, heating means for said tube and peak supported by said handle, means in said handle for supporting a coiled strand of soldering tin which is projectible through said tube and into proximity to said peak, said peak comprising a member detachably secured to said copper tube, said member including a tubular portion removably engaged with said tube, and a pyramidal end portion having solder exuding means therein, and said means comprising an elongated slot in one of the walls of said pyramidal end portion.

4. The structure according to claim 3, wherein said tubular portion includes a plurality of circumferentially spaced tube engaging tongues.

5. The structure according to claim 3, wherein said tubular portion is provided with a tongue having a locking head on its free end which is removably engageable within a depression in said tube.

References Cited in the file of this patent

UNITED STATES PATENTS

| | | |
|---|---|---|
| 1,215,693 | Orme | Feb. 13, 1917 |
| 2,416,370 | Barstad | Feb. 25, 1947 |